US011353111B2

(12) United States Patent
Olson et al.

(10) Patent No.: US 11,353,111 B2
(45) Date of Patent: Jun. 7, 2022

(54) TRACTION CONTROL METHOD FOR A ROTARY MIXER

(71) Applicant: Caterpillar Paving Products Inc., Brooklyn Park, MN (US)

(72) Inventors: Thomas J. Olson, North Dayton, MN (US); Corwin E. Storer, Bartonville, IL (US); Ryan A. Enot, Dunlap, IL (US); Matthew-David S. Frantz, Eden Prairie, MN (US); Derek P. Nieuwsma, Loretto, MN (US); Rustin G. Metzger, Congerville, IL (US); Nathaniel S. Doy, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 527 days.

(21) Appl. No.: 16/272,479

(22) Filed: Feb. 11, 2019

(65) Prior Publication Data

US 2020/0256462 A1  Aug. 13, 2020

(51) Int. Cl.
| | |
|---|---|
| *F16H 61/456* | (2010.01) |
| *F16H 61/47* | (2010.01) |
| *F16H 61/431* | (2010.01) |
| *F16H 61/4008* | (2010.01) |
| *F16H 59/50* | (2006.01) |
| *E01C 23/12* | (2006.01) |
| *E02F 3/78* | (2006.01) |
| *E01C 23/088* | (2006.01) |

(52) U.S. Cl.
CPC ....... *F16H 61/456* (2013.01); *F16H 61/4008* (2013.01); *F16H 61/431* (2013.01); *F16H 61/47* (2013.01); *E01C 23/088* (2013.01); *E01C 23/127* (2013.01); *E02F 3/783* (2013.01); *F16H 2059/506* (2013.01)

(58) Field of Classification Search
None
See application file for complete search history.

(56) References Cited

U.S. PATENT DOCUMENTS

| | | | |
|---|---|---|---|
| 6,206,131 B1 | 3/2001 | Lauck | |
| 7,121,762 B2 | 10/2006 | Quenzi et al. | |
| 7,497,298 B2* | 3/2009 | Shearer | E02F 3/7663 180/333 |

(Continued)

OTHER PUBLICATIONS

"RM500B—Rotary Mixer" brochure. Caterpillar. (Year: 2014).*

(Continued)

*Primary Examiner* — F Daniel Lopez
*Assistant Examiner* — Michael Quandt
(74) *Attorney, Agent, or Firm* — Schwegman, Lundberg & Woessner

(57) ABSTRACT

A rotary mixer can include a frame, a rotor attached to the frame, four wheels attached to the frame for moving the rotary mixer, and a drive system for driving the four wheels, the drive system can include four independent hydrostatic drive loops, each of the independent hydrostatic drive loops associated with one of the wheels such that each one of the independent hydrostatic drive loops independently drives one of the four wheels; wherein the drive system includes a pressure balance mode of operation for relatively good traction ground or road conditions, and a wheel speed synchronization mode of operation for relatively poor traction ground or road conditions.

11 Claims, 3 Drawing Sheets

(56) References Cited

U.S. PATENT DOCUMENTS

| | | | |
|---|---|---|---|
| 7,628,240 B2* | 12/2009 | Caldwell | B60K 17/356 180/242 |
| 8,005,600 B2* | 8/2011 | Krimbacher | F16H 61/475 701/54 |
| 8,055,411 B2* | 11/2011 | Thomson | B62D 9/002 701/41 |
| 8,244,442 B2 | 8/2012 | Craig et al. | |
| 8,727,047 B2 | 5/2014 | Janzen et al. | |
| 8,880,301 B2* | 11/2014 | Velde | B60K 17/356 701/50 |
| 9,169,604 B2 | 10/2015 | Pieske et al. | |
| 9,328,821 B2 | 5/2016 | Storer | |
| 9,435,104 B2 | 9/2016 | Juricak et al. | |
| 9,605,393 B2* | 3/2017 | Schlenker | E01C 21/00 |
| 2018/0274194 A1 | 9/2018 | Stromsoe | |

OTHER PUBLICATIONS

"Cat® RM500B Reclaimer Stabilizer (United States, Europe, Canada)" by "CatPaving". https://www.youtube.com/watch?v=7woDOIrH1Y8. Accessed Sep. 17, 2021. (Year: 2014).*

* cited by examiner

TRACTION CONTROL METHOD FOR A ROTARY MIXER

TECHNICAL FIELD

This disclosure relates to road construction equipment, and more specifically to a system of traction control for a rotary mixer.

BACKGROUND

Rotary mixers or soil stabilizers are road construction machines that can be used to prepare or stabilize a roadbed, parking lot, soil bioremediation or similar applications. This is accomplished by reclaiming an asphalt road surface or by adding a material such as lime, fly ash, soil cement or other additive to the existing soil, for example. Traction can be an issue on a rubber tired rotary mixer, especially in deep, soft soil.

Some of these machines can have a four pump and four motor propel system that uses a pressure balance system to equally distribute propel force about the four wheels via four independent drive loops. The issue comes in poor traction conditions where the pumps on wheels with traction destroke for a time, while the other wheels spin. In other words, pressure is not allowed to develop in the independent wheel drive loops that have better traction, at least not until a time delay has occurred. This adversely affects machine productivity by destroking pumps (slowing the machine down) or potentially the machine can get stuck because not all of the available rimpull (tractive effort) is being put on the ground because pressure is limited in one or more of the independent drive loops. U.S. Pat. No. 6,206,131 describes a traction control system for hydraulic drives.

SUMMARY

In an example according to this disclosure, a rotary mixer includes a frame, a rotor attached to the frame, four wheels attached to the frame for moving the rotary mixer, and a drive system for driving the four wheels. The drive system includes four independent hydrostatic drive loops, each of the independent hydrostatic drive loops associated with one of the wheels such that each one of the independent hydrostatic drive loops independently drives one of the four wheels; wherein the drive system includes a pressure balance mode of operation for relatively good traction ground or road conditions, and a wheel speed synchronization mode of operation for relatively poor traction ground or road conditions.

In one example, a drive system for a machine driven by four wheels can include four independent hydrostatic drive loops, each of the independent hydrostatic drive loops associated with one of the four wheels such that each one of the independent hydrostatic drive loops independently drives one of the four wheels; wherein the drive system includes a pressure balance mode of operation for relatively good traction ground or road conditions in which a pressure in each of the independent hydrostatic drive loops is equalized and a wheel speed synchronization mode of operation for relatively poor traction ground or road conditions in which a wheel speed of each of the four wheels is equalized.

In one example, a method of traction control for a rotary mixer having four independently driven wheels can include operating a drive system for the rotary mixer in a default pressure balance mode of operation for relatively good traction ground or road conditions, wherein in the pressure balance mode of operation each of four independent hydrostatic pumps are adjusted to equalize a pressure in each of four independent hydrostatic drive loops which are associated with each of the four independent hydrostatic pumps, wherein each of the four independent hydrostatic drive loops drives one of the four wheels of the rotary mixer; and selecting a wheel speed synchronization mode of operation for the drive system for relatively poor traction ground or road conditions, wherein in the wheel speed synchronization mode of operation the pressure in each of the four independent hydrostatic drive loops develops independently to keep a wheel speed of each one of the four wheels equalized with each other.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
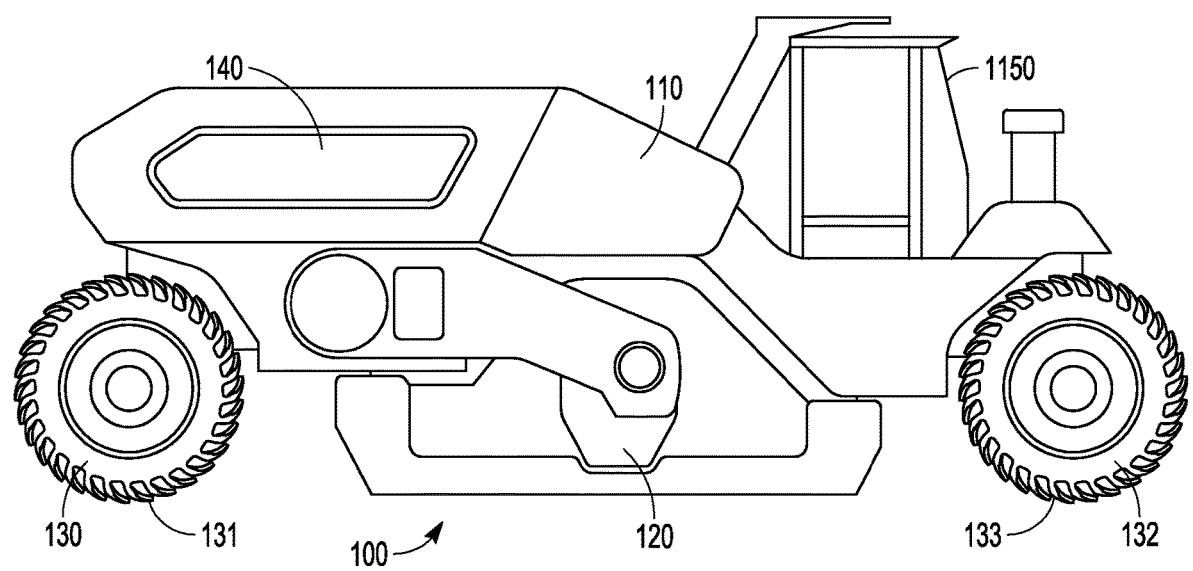
FIG. 1 shows a side view of a rotary mixer, in accordance with one embodiment.

FIG. 1 shows a side view of a rotary mixer 100, in accordance with one embodiment. The rotary mixer 100 can also be known as a reclaimer or a soil stabilizer. The rotary mixer 100 generally includes a frame 110, a rotor 120 attached to the frame 110, and four rubber wheels 130, 131, 132, 133 attached to the frame 110 for moving the rotary mixer 100. The rotary mixer 100 can also include a power source 140 such as a diesel engine, which drives the various components, and an operator station 150 which can include various controls to control the operations of the rotary mixer 100.

The rotor 120 is rotated at a predetermined depth to dig up a soil surface or asphalt surface and then to lay the soil or pulverized asphalt back down to prepare a roadbed or other ground preparation. In some examples, further stabilizing material can be added to the soil or pulverized asphalt to be mixed into the roadbed. As will be detailed below the rotary mixer 100 includes a hydraulic drive system to drive each of the wheels 130-133 independently.

Figure 2:
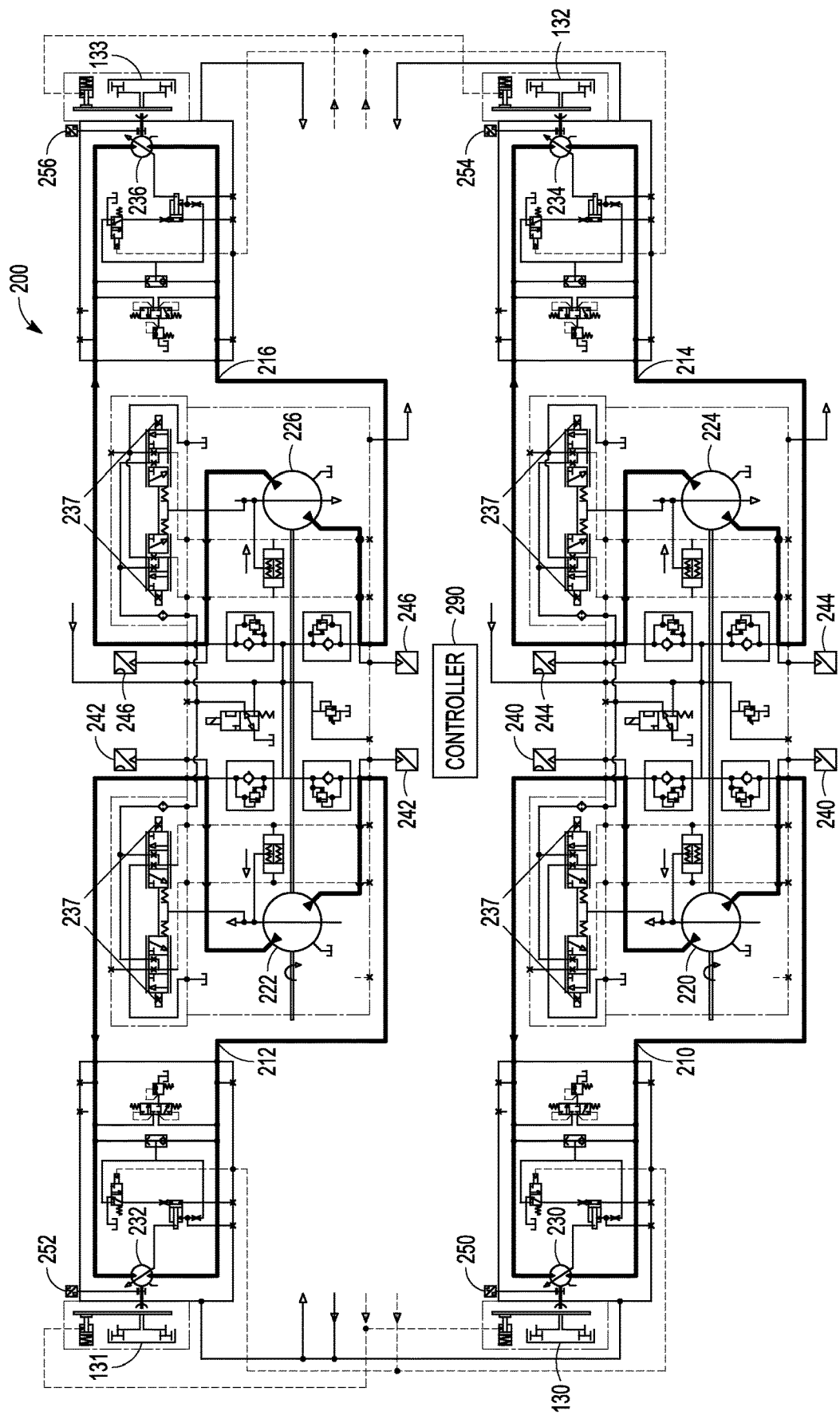
FIG. 2 shows a schematic diagram of a drive system for a rotary mixer, in accordance with one embodiment.

FIG. 2 shows a schematic diagram of a drive system 200 for the rotary mixer 100, in accordance with one embodiment. The drive system 200 is used for driving the four wheels 130-133. In this example, the drive system 200 includes four independent hydrostatic drive loops 210, 212, 214, 216 each of which define a closed loop drive loop. Each of the independent hydrostatic drive loops 210-216 can be associated with one of the wheels 130-133 such that each one of the independent hydrostatic drive loops 210-216 independently drives one of the four wheels 130-133.

In the drive system 200, each of the four independent hydrostatic drive loops 210-216 includes a hydrostatic pump 220, 222, 224, 226 and a corresponding hydrostatic motor 230, 232, 234, 236, with each hydrostatic motor 230-236 operatively coupled to a corresponding one of the hydrostatic pumps 220-226.

Eight solenoids 237 can be used in the system, with a pair of solenoids 237 in each of the four independent hydrostatic drive loops 210-216. The solenoids 237 proportionally control the pumps 220, 222, 224, 226 depending on input by a controller 290. For example, the pump stroke of each pump 220, 222, 224, 226 can be based on the electric current sent to the solenoids 237 by the controller 290.

In one embodiment, the drive system 200 includes a pressure balance mode of operation to be used for relatively good traction ground or road conditions, and a wheel speed synchronization mode of operation to be used for relatively poor traction ground or road conditions, such as a muddy or otherwise slick surface. As will be further detailed herein, in the pressure balance mode of operation a pressure in each of the independent hydrostatic drive loops 210-216 is equalized and in the wheel speed synchronization mode of operation a tangential wheel speed of each of the four wheels 130-133 is equalized.

For example, when the drive system 200 is in the pressure balance mode of operation the pump strokes of each of the four hydrostatic pumps 220-226 are adjusted so as to equalize the pressure in each of the four independent hydrostatic drive loops 210-216 and maintain commanded propel speed.

The pressure balance mode of operation can be useful to prevent machine "bucking" on hard ground or road conditions having good traction. This is because equalizing the pressure in the four hydrostatic drive loops 210-216 acts as a hydraulic version of a conventional gear differential.

However, an issue can arise with muddy/slippery ground conditions because traction available varies widely. For example, using the pressure balance mode of operation, the pumps on the drive loops with traction available have to be de-stroked during wheel slippage, because the system attempts to the equalize the drive loop pressures. When one or more wheels spin for a time, the pumps on the other drive loops are de-stroked, stopping or significantly slowing or stopping the machine. This has a negative impact on productivity.

In this example, the pressure balance mode of operation described above is the default mode of operation for the drive system 200 and is used while the rotary mixer is traveling on a good traction ground or road condition. The wheel speed synchronization mode of operation can then be manually or automatically activated when relatively poor traction ground or road conditions are encountered.

In the wheel speed synchronization mode of operation, the pressure in each of the four independent hydrostatic drive loops 210-216 develops independently. To keep the tangential wheel speed of each of the four wheels 130-133 equalized, speed sensors 250, 252, 254, 256 in each wheel motor provide input to the controller 290 and the controller 290 adjusts its output to the pump controls to maintain operator commanded speed. In one example, the controller pump stroke commands in each of the four independent hydrostatic drive loops 210-216 are adjusted independently so as to keep the wheel speed equalized.

The wheel speed synchronization mode of operation is analogous to engaging differential locks. All the wheels 130-133 are driven at the same speed, with pressure in each of the four hydrostatic drive loops 210-216 developing independently as available traction allows.

The advantage to providing the wheel speed synchronization mode of operation in the present system is that the propel drive loop pressures can develop independently. In the event of one or more of the wheels 130-133 breaking traction (start of wheel slip), the wheels with traction can develop increased rimpull (tractive effort) because their respective drive loop can develop increased pressure. In the wheel speed synchronization mode of operation, the loop drive pressures develop by the laws of physics depending on rimpull (tractive effort) required by the machine. Thus, developed rimpull (tractive effort) matches what it takes to move the machine. If the machine cannot or does not put enough rimpull (tractive effort) to the ground, it will not move. In speed synchronization mode, pressures develop in the loops independently so rimpull develops to a point where the machine moves (rimpull equals the sum of rolling resistance plus grade/slope resistance). There is no destroking of pump(s) to reduce pressure in a given loop that reduces overall rimpull.

For example, if a particular wheel encounters a low traction spot, drive pressures in the other loops will increase automatically because pressure cannot develop as high on the loop(s) with low traction. Accordingly, the tires that have traction can pull.

In one embodiment, the drive system 200 can include a pressure sensor 240, 242, 244, 246 associated with each of the four independent hydrostatic drive loops 210-216. The pressure sensors 240-246 can each include a pair of pressure sensors with a pressure transducer on each side of the respective hydrostatic pump 220-226 to measure the pressure differential at the hydrostatic pump 220-226. The drive system 200 can further include a speed sensor 250, 252, 254, 256 associated with each wheel 130-133 that is associated with each of the four independent hydrostatic drive loops 210-216. The speed sensors can sense the rotational speed of each wheel 130-133.

The drive system can include the controller 290 operatively connected to each of the pressure sensors 240-246, and the speed sensors 250-256, and to the solenoids 237 and hydrostatic pumps 220-226 of each of the four independent hydrostatic drive loops 210-216.

The controller 290 can include hardware and software to receive, process, and deliver signals to and from the various components and from the machine operator. For example, the controller 290 can receive signals from each of the pressure sensors 240-246 describing the pressure in each hydrostatic drive loop 210-216 and receive signals from the speed sensors 250-256 describing the speed of each wheel 130-133. This information can be processed and, depending on which operating mode the drive system 200 is in, various signals can be sent to each of the hydrostatic pumps 220-226 to adjust pump displacements via solenoids 237 to raise or lower the pressure in the given hydrostatic drive loop 210-216 or to adjust pump displacement to maintain wheel speed synchronization.

For example, in the pressure balance mode of operation, the controller 290 adjusts the pump strokes of each of the four hydrostatic pumps 220-226 in view of the pressure sensed by each of the pressure sensors 240-246 so as to equalize the pressure in each of the four independent hydrostatic drive loops 210-216. Conversely, in the wheel speed synchronization mode of operation, the controller 290 adjusts the pump displacements in each of the four independent hydrostatic drive loops 210-216 independently, depending on a speed of each of the wheels 130-133 as sensed by the speed sensors 250-256 so as to keep the speeds of each wheel 130-133 equalized.

INDUSTRIAL APPLICABILITY

The present system is applicable to a rotary mixer used for various applications such as full-depth reclamation or soil stabilization. In these applications various ground or road conditions have can have varying tractions.

Figure 3:
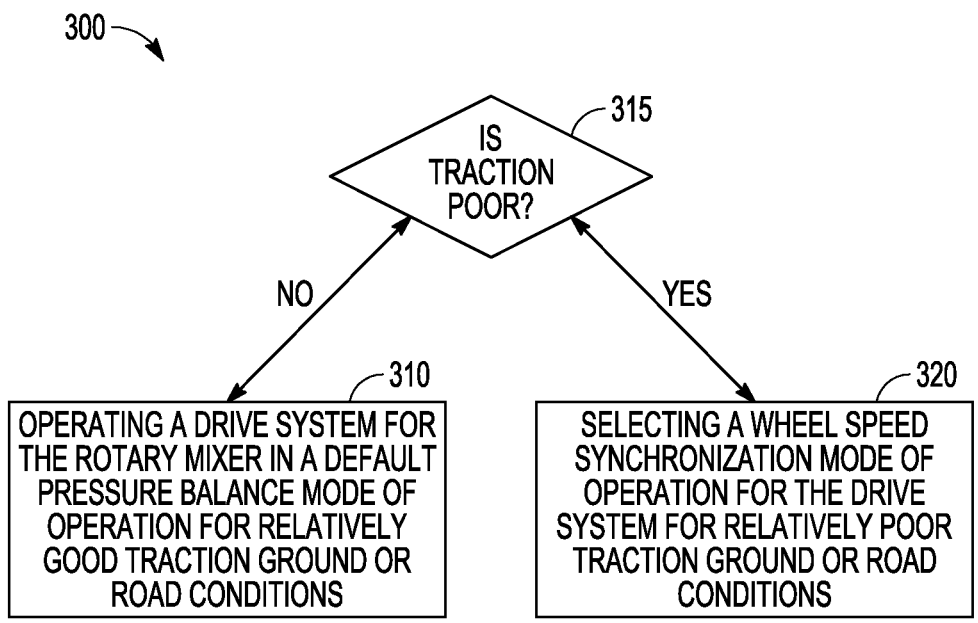
FIG. 3 shows a flow chart of a method of traction control for a rotary mixer, in accordance with one embodiment.

For example, FIG. 3 shows a flow chart of a method 300 of traction control for a rotary mixer, in accordance with one embodiment. The method will be described using the features of FIGS. 1 and 2, as discussed above.

Here, the method 300 includes operating a drive system 310 for the rotary mixer 100 in a default pressure balance mode of operation for relatively good traction ground or road conditions. In such an operating mode the pump strokes of each of the four independent hydrostatic pumps 220-226 are adjusted to equalize a pressure in each of four independent hydrostatic drive loops 210-216 which are associated with each of the four independent hydrostatic pumps 220-226. Each of the four independent hydrostatic drive loops 210-216 drives one of the four wheels 130-133 of the rotary mixer 100.

If poor traction is encountered 315, (for example, if the operator realizes a wheel is slipping or spinning, or the controller 290 diagnoses slippage from a speed sensor in one of the drive loops 210-216), the method 300 includes selecting a wheel speed synchronization mode of operation 320 for the drive system 200 for the relatively poor traction ground or road condition. In the wheel speed synchronization mode of operation, the pressure in each of the four independent hydrostatic drive loops 210-126 develops independently of each other to keep a wheel speed of each one of the four wheels 130-133 equalized with each other.

In one embodiment, selecting the drive system operational mode can be done automatically by the controller 290 depending on traction conditions. In another example, the drive system operational mode can be selected by the rotary mixer operator. If traction conditions change so the traction is now good, the operator or the controller 290 can return to the default pressure balance mode of operation 310.

The drive system 200 for the method 300 can include the pressure sensors 240-246 associated with each of the four independent hydrostatic drive loops 210-216 and the speed sensors 250-256 associated with the wheels 130-133 associated with each of the four independent hydrostatic drive loops 210-216. The drive system 200 can further include the controller 290 that is operatively connected to each of the pressure sensors 240-246 and to the speed sensors 250-256 and to the hydrostatic pump 210-216 of each of the four independent hydrostatic drive loops 210-216.

The controller 290 can receive signals from each of the pressure sensors 240-246 and speed sensors 250-256 and output signals to each of the hydrostatic pumps 220-226. As discussed above, when in the pressure balance mode of operation, the controller 290 adjusts the pump strokes of each of the four hydrostatic pumps 220-226 in view of the pressure sensed by each of the pressure sensors 240-246 so as to equalize the pressure in each of the four independent hydrostatic drive loops 210-216. In this mode, the pressures are equalized in the drive loops by adjusting pump strokes. This is analogous to a vehicle with a conventional gear differential.

Conversely, when in the wheel speed synchronization mode of operation, the controller 290 adjusts the pump stroke in each of the four independent hydrostatic drive loops 210-216 independently depending on a speed of each of the wheels 130-133 as sensed by the speed sensors 250-256 so as to equalize the speed of each of the wheels 130-133. This is analogous to a vehicle in 4-wheel drive mode with differential lock.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A rotary mixer, comprising:
   a frame;
   a rotor attached to the frame;
   four wheels attached to the frame for moving the rotary mixer; and
   a drive system for driving the four wheels, the drive system including:
   four independent hydrostatic drive loops, each of the independent hydrostatic drive loops associated with one of the wheels such that each one of the independent hydrostatic drive loops independently drives one of the four wheels;
   wherein the drive system includes a pressure balance mode of operation for ground or road traction conditions where none of the four wheels breaks traction and spins, and a wheel speed synchronization mode of operation for ground or road traction conditions where at least one of the four wheels breaks traction and spins;
   wherein the pressure balance mode of operation is a default mode of operation for the drive system and the wheel speed synchronization mode of operation is activated when at least one of the four wheels breaks traction and spins.

2. The rotary mixer of claim 1, wherein each of the four independent hydrostatic drive loops includes a hydrostatic pump and a corresponding hydrostatic motor, with each hydrostatic motor coupled to a corresponding one of the hydrostatic pumps.

3. The rotary mixer of claim 2, wherein in the pressure balance mode of operation each of the four hydrostatic pumps is adjusted to equalize the pressure in each of the four independent hydrostatic drive loops.

4. The rotary mixer of claim 2, wherein in the wheel speed synchronization mode of operation, a pressure in each of the four independent hydrostatic drive loops develops independently to keep a wheel speed of each of the four wheels equalized.

5. The rotary mixer of claim 4, wherein the pressure in each of the four independent hydrostatic drive loops develops independently depending on the traction of the corresponding wheel.

6. The rotary mixer of claim 1, wherein the drive system includes a pressure sensor associated with each of the four independent hydrostatic drive loops and a speed sensor associated with the wheel associated with each of the four independent hydrostatic drive loops and a controller is operatively connected to each of the pressure sensors and the speed sensors and to a hydrostatic pump of each of the four independent hydrostatic drive loops.

7. The rotary mixer of claim 6, wherein the controller receives signals from each of the pressure sensors and speed sensors and outputs signals to each of the hydrostatic pumps.

8. The rotary mixer of claim 7, wherein in the pressure balance mode of operation, the controller adjusts each of the four hydrostatic pumps in view of the pressure sensed by each of the pressure sensors so as to equalize the pressure in each of the four independent hydrostatic drive loops, and wherein in the wheel speed synchronization mode of operation, the controller adjusts the pump displacements in each of the four independent hydrostatic drive loops independently depending on a speed of each of the wheels as sensed by the speed sensors.

9. A method of traction control for a rotary mixer having four independently driven wheels, the method comprising:
operating a drive system for the rotary mixer in a default pressure balance mode of operation for ground or road traction conditions where none of the four wheels break traction and spins, wherein in the pressure balance mode of operation each of four independent hydrostatic pumps are adjusted to equalize a pressure in each of four independent hydrostatic drive loops which are associated with each of the four independent hydrostatic pumps, wherein each of the four independent hydrostatic drive loops drives one of the four wheels of the rotary mixer; and
selecting a wheel speed synchronization mode of operation for the drive system for ground or road traction conditions where at least one of the four wheels breaks traction and spins, wherein in the wheel speed synchronization mode of operation the pressure in each of the four independent hydrostatic drive loops develops independently to keep a wheel speed of each one of the four wheels equalized with each other.

10. The method of traction control for the rotary mixer of claim 9, where selecting the wheel speed synchronization mode is done by a controller.

11. The method of traction control for the rotary mixer of claim 9, wherein the drive system includes a pressure sensor associated with each of the four independent hydrostatic drive loops and a speed sensor associated with the wheel associated with each of the four independent hydrostatic drive loops and a controller is operatively connected to each of the pressure sensors and the speed sensors and to the hydrostatic pump of each of the four independent hydrostatic drive loops, wherein the controller receives signals from each of the pressure sensors and speed sensors and outputs signals to each of the hydrostatic pumps, and wherein in the pressure balance mode of operation, the controller adjusts each of the four hydrostatic pumps in view of the pressure sensed by each of the pressure sensors so as to equalize the pressure in each of the four independent hydrostatic drive loops, and wherein in the wheel speed synchronization mode of operation, the controller adjusts the pump stroke in each of the four independent hydrostatic drive loops independently depending on a speed of each of the wheels as sensed by the speed sensors so as to equalize the speed of each of the wheels.

\* \* \* \* \*